Patented June 6, 1950

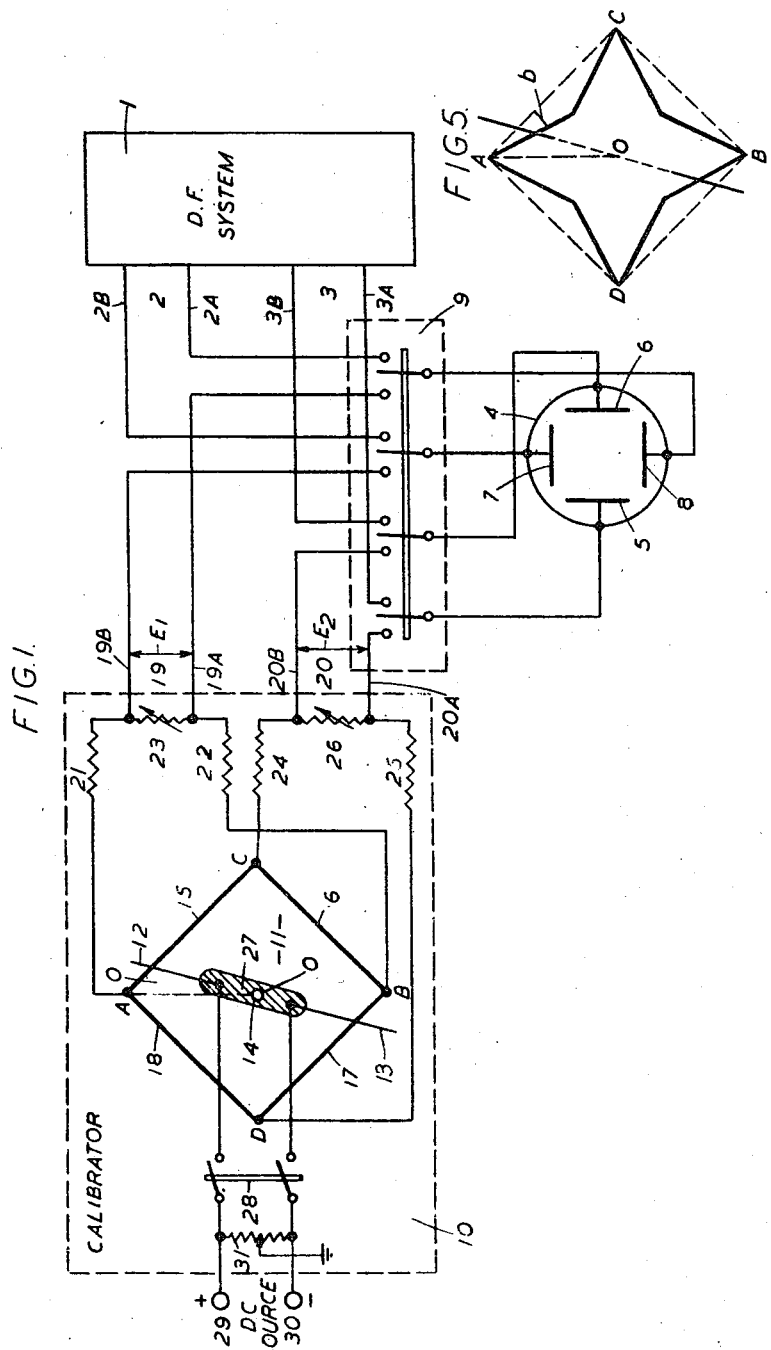

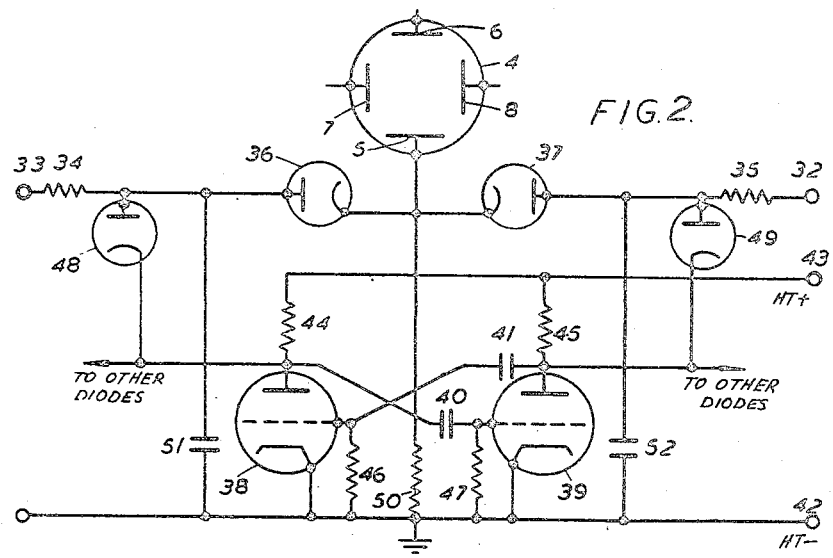
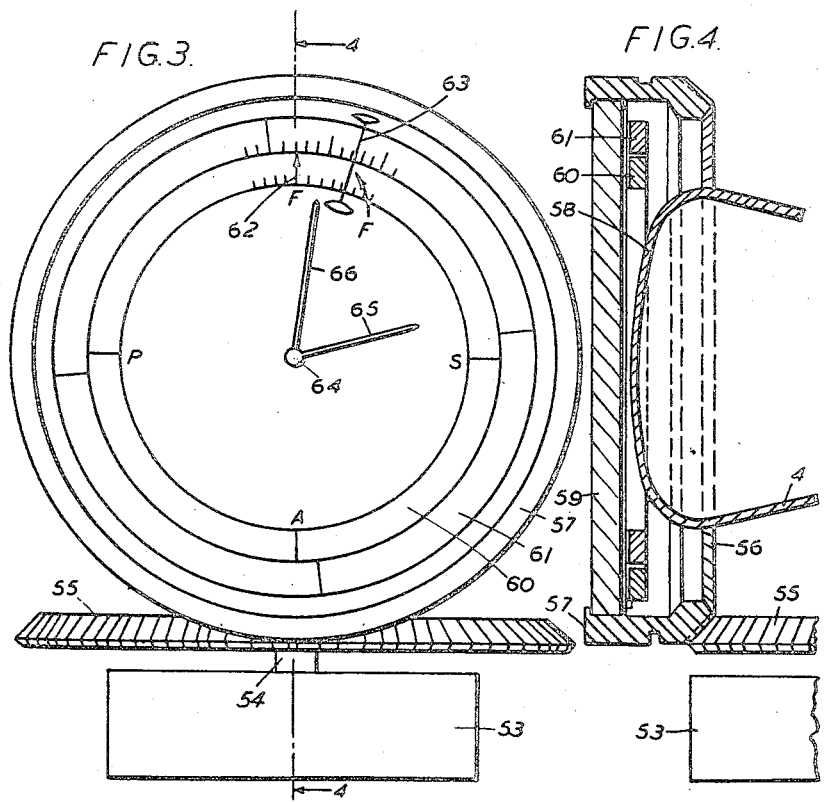

2,510,074

UNITED STATES PATENT OFFICE 2,510,074

DISPLAY ARRANGEMENT FOR ELECTRIC OSCILLOGRAPHS

Richard Francis Cleaver, London, England, assignor to International Standard Electric Corporation, New York, N. Y., a corporation of Delaware Application May 14, 1947, Serial No. 747,943
In Great Britain May 14, 1946

12 Claims. (Cl. 343—113)

The present invention relates to display arrangements for electric oscillographs, and more particularly, though not exclusively, it concerns oscillographs employed in radio direction finding systems.

In a known type of automatic direction finding system having fixed receiving antennas, a radial trace is produced on the screen of a cathode ray oscillograph, and the angular position of the trace gives the bearing of a transmitting or beacon station. The position of the trace is determined by the ratio of two voltages, which are proportional to the strengths of the signals induced in two antenna combinations. The position of the trace is affected by any inaccuracy in the construction of the oscillograph, and according to present practice, the errors caused by the inaccuracy are minimised by individual calibration of the oscillographs. This process is rather costly, and is furthermore undesirable in view of the limited life of oscillographs.

Another source of error in this system is the parallax arising from the fact that the oscillograph screen is convex, while the scale on which the position of the radial trace is read is normally flat, and is therefore spaced away from the screen around the edges. Moreover, the luminous trace is generally produced on the inner surface of the end of the tube, while the scale is usually outside. In the case of a large tube the glass may be ⅛ inch thick, or more.

It is the principal object of the present invention to overcome these difficulties by means of an arrangement in which the necessary accuracy of reading is obtained with any oscillograph without the necessity for calibrating it, and in which parallax may be completely eliminated.

The invention accordingly provides a display arrangement for an electric oscillograph comprising means for periodically producing a first indication on the screen of the oscillograph in accordance with an unknown quantity of given type to be measured, an adjustable device adapted to produce a comparison quantity of like type and of any desired known magnitude within a given range, means for periodically producing a second indication on the said screen in accordance with the said comparison quantity, the said second indication alternating with the first indication, and means for adjusting the said device in such manner as to bring the two said indications into registration on the said screen whereby the value of the unknown quantity is given by that of the known comparison quantity.

Such a display arrangement may clearly be employed in any system in which measurements are made from the indication or trace produced on an oscillograph screen, the position of such indication or trace being determined by the quantity to be measured. It is, however, of particular application to a radio direction finding system, and the embodiment which will be described to illustrate the invention is such a system.

The embodiment is illustrated on the accompanying drawings in which:

Fig. 1 shows a schematic circuit diagram of the embodiment;

Fig. 2 shows details of an electronic switch shown in Fig. 1;

Fig. 3 shows a front view of the preferred method of arranging the oscillograph and scales on which the bearings of aircraft or the like are indicated and measured;

Fig. 4 shows a section of the lines 4—4 of Fig. 3; and Fig. 5 shows a diagram of a potentiometer which may be used in Fig. 1.

The embodiment to be described is a radio direction finding system adapted to be installed on a vessel such as an aircraft carrier for determining the bearings of aircraft or other vessels in the vicinity of the vessel. It can also be used for determining the bearing of the vessel itself with respect to a fixed beacon station. This embodiment merely illustrates one application of the invention, which can be employed in quite other circumstances which are not related to direction finding systems.

Fig. 1 shows a radio direction finding system 1 of known character not shown in detail. It will be supposed to include the necessary antenna system for receiving waves from an aircraft or other transmitting station and for deriving therefrom in two output circuits 2 and 3 in known manner deflecting voltages whose ratio is substantially proportional to the tangent of the bearing angle of the transmitting station. These deflecting voltages are applied to an indicating cathode ray oscillograph 4 of which only the two pairs of deflecting plates 5, 6 and 7, 8 are shown. This oscillograph is of conventional type, and the electron gun and operating arrangements are not shown.

The output circuits 2 and 3 of the direction finding system 1 are connected to the plates of the oscillograph 4 through a periodically operated change-over switch 9 to which is also connected a calibrator 10 provided according to the invention to produce a cursor spot or trace on the oscillograph screen. The calibrator 10 includes a square potentiometer 11 having a pair of straight contactors 12 and 13 adapted to rotate about an axis 14 passing through the centre O of the square. This potentiometer is formed from four similar, straight, uniform resistance elements 15, 16, 17, 18, arranged to form a square ABCD in the manner described in the specification of co-pending application No. 720,529, filed January 7, 1947, now abandoned, and is adapted to produce in two output circuits 19 and 20 corresponding voltages whose ratio is equal to the tangent of the angle $\theta$ between the line of the contactors 12 and 13 and OA.

The switch 9 connects the plates 7, 8 and 5, 6 respectively, of the oscillograph 4, alternately to the output circuits 2 and 3 of the direction finding system 1, and to the output circuits 19 and 20 of the calibrator 10. This switch may operate at a frequency of 100 alternations per second, for example, and has been shown diagrammatically. It could be a mechanical switch of any suitable pattern, but it may also be an electronic switch, preferably of the kind described in the specification of co-pending application No. 724,318, filed January 25, 1947, and illustrated in the accompanying Fig. 2, which is substantially a reproduction of Fig. 1 of that specification. The action of this switch will be explained later.

The diagonal corners A and B of the potentiometer 11 (Fig. 1) are connected to a series circuit consisting of two fixed resistances 21 and 22, and an adjustable resistance 23, while the corners C and D are connected to a similar series circuit of two fixed resistances 24 and 25, and a resistance 26 which may also be variable. Resistances 21, 22, 24 and 25 should preferably be equal, and resistances 23 and 26 should be similar.

The two contactors 12 and 13 are fixed to an insulating member 27 so that each passes through the axis 14 about which they rotate. The contactors are connected respectively through corresponding parts of a switch 28 to terminals 29 and 30, to which an appropriate direct current source (not shown) is intended to be connected. A potentiometer 31 with its movable contact connected to ground may be connected between the terminals 29 and 30 for the purpose of balancing the direct current source to ground.

The circuit of the calibrator 10 will be seen to be the same as the circuit of Fig. 3 of application No. 720,529 mentioned above, except that the alternating current source is replaced by a direct current source. It is shown in that specification that if the resistances 23 and 26 of Fig. 1 accompanying this specification are equal, if resistances 21, 23, 24 and 25 are also equal, and if $E_1$ and $E_2$ are the voltages obtained at the output circuits 19 and 20 respectively, then $E_2/E_1 = \tan \theta$. The potentiometer 11 is provided with a scale of angles, and a corresponding index by means of which the angle $\theta$ may be accurately read. A preferred form of such arrangements will be described with reference to Figs. 3 and 4.

When the switch 9 is thrown to the right-hand side, a single spot will be obtained on the oscillograph screen at a point whose co-ordinates are determined by the voltages produced in the output circuits 2 and 3 of the direction finding system 1. The angular polar co-ordinate $\phi$ of the spot is a function of the direction of the transmitting station and of the deflection characteristic of the oscillograph. When the switch is thrown to the left-hand side, a single spot is obtained whose co-ordinates are determined by the voltages $E_1$ and $E_2$ and also by the deflection characteristics of the oscillograph. When the switch alternates in the manner described, the two spots will be seen together. If resistances 23 and 26 be coupled so as to be simultaneously adjusted in such manner that equal maximum values of $E_1$ and $E_2$ are produced (that is, when the angle $\theta$ of the potentiometer is 0° and 90° respectively), then under this condition it will be possible to adjust these resistances and the potentiometer 11 so that the two spots coincide. Under these conditions both spots are equally affected by the deflection characteristics of the oscillograph which therefore cancel out, and then $\phi=\theta$, and the bearing of the transmitting station will be obtained with high accuracy from the reading of the potentiometer. It is clear, therefore, that this result is not affected by the errors of the oscillograph. Furthermore, all parallax has been eliminated.

It is clear, however, that if the deflecting voltages derived from circuits 2 and 3 of the direction finding system 1 are not accurately related according to the tangent law as a result of errors in the system, or for other reasons, a bearing error will be produced. In certain circumstances to be described later, the resistances 23 and/or 26 may be separately adjusted, or the potentiometer 11 may be modified, so that the voltages $E_1$ and $E_2$ are related in a manner which departs similarly from the tangent law, by which means the error may be compensated.

Single spots on the oscillograph screen are, however, not very convenient to work with, and it is far preferable to derive radial line traces from the deflecting voltages in the manner explained in the specification of co-pending application No. 667,259, filed May 4, 1946, now Patent No. 2,502,428. In the preferred form of the switch 9 shown in Fig. 2, such arrangements have been included. In what follows, the spot or trace derived from the calibrator 10 will be called an "electronic capsor."

The resistance elements 15, 16, 17 and 18 which make up the potentiometer 11 may be similar strips of insulating material closely and evenly wound with resistance wire, or they may be moulded from resistance material and they may be arranged in any of the manners described in application Number 720,529.

Fig. 2 shows the preferred form of the switch 9, but only the circuit connected to one of the plates 5 of the oscillograph 4 is shown. The circuits for the other plates are similar as will be explained. Conductors 3A and 20A of Fig. 1 will be respectively connected to terminals 32 and 33 of Fig. 2. The terminals 32 and 33 are respectively connected to the plate 5 of the oscillograph through resistances 34 and 35, and through blocking devices consisting of diodes 36 and 37. The diodes have their cathodes connected to the plate 5, and are arranged to be alternately unblocked by pulses from a multivibrator of conventional pattern consisting of two similar valves 38 and 39 arranged so that the anode of each is cross-connected to the control grid of the other through respective condensers 40 and 41.

The cathodes are directly connected to the ground terminal 42 (which is also the negative terminal of the high tension source for the valves), and the anodes are connected to the positive high tension terminal 43 through resistances 44 and 45. The control grids of the valves 38 and 39 are grounded through resistances 46 and 47. This is a well known arrangement and may be made to generate rectangular pulses whose repetition frequency and duration depend upon the time constants of the two condenser charging circuits.

The anode of the valve 38 is connected to the cathode of another blocking device consisting of diode 48, the anode of which is connected to the anode of the diode 36. Likewise the anode of the valve 39 is connected to the cathode of a blocking diode 49, the anode of which is connected to the anode of the diode 37. The plate 5 of the oscillograph 4 is connected to ground through a resistance 50.

Since the unblocking periods of the diodes 36 and 37 should preferably be equal, the elements associated with the two valves 38 and 39 should preferably be respectively equal, so that the condenser charging circuits will have equal time constants.

In order to explain the action of the circuit of Fig. 2, it will be assumed that the multivibrator has been so designed that the potential of the anodes of the valves 38 and 39 with respect to ground alternates between the two values +100 volts and +600 volts at a frequency of 100 cycles per second, for example, and that the potentials applied to the terminals 32 and 33 do not vary outside the limits +100 volts and +500 volts. When the potential of the anode of valve 38 is +600 volts, the diode 48 will be blocked and the positive potential at terminal 33 will be applied through the diode 36 to the plate 5, since this diode will be unblocked in this condition. If the resistance 50 is large compared with the resistance 34, there will be a negligible potential drop in the resistance 34. Under these conditions the diode 49 will have a potential of +100 volts on its cathode from the anode of the valve 39, and this will hold the potential of the anode of the diode 49 substantially at +100 volts, so that the diode 37 will be blocked, thus effectively disconnecting terminal 32 from the plate 5. It will be evident that when the multivibrator switches over, the diodes 36 and 39 will be blocked and the diodes 37 and 38 will be unblocked, thus applying the potential at terminal 32 to the plate 5 instead of that at terminal 33. It will be clear, therefore, that the potentials at terminals 32 and 33 will be alternately applied to the plate 5 for equal periods of time at a frequency of, say, 100 cycles per second.

It will be understood that each of the deflecting plates of the oscillograph 1 will be provided with elements similar to the elements 32, 33, 34, 35, 36, 37, 48, 49 and 50, arranged in a similar manner, all of which are operated from the one single multivibrator which is preferably not duplicated. These extra elements have not been shown in order to avoid complicating the figure. In such a case all the diodes corresponding to 48 will be connected to the anode of the valve 38 and all the diodes corresponding to 49 will be connected to the anode of the valve 39. The three other terminals such as 32 corresponding respectively to the plates 6, 7 and 8 are connected to conductors 3B, 2A and 2B, respectively, of Fig. 1; and the three other terminals such as 33 corresponding respectively to these plates are connected to conductors 20B, 19A and 19B. Then the spot corresponding to the potentials applied to all the terminals similar to 32 from the direction finding system 1 will be produced alternately with the spot corresponding to the potentials applied to all the terminals similar to 33 from the calibrator 10 (the switch 28 being closed), and if the switching rate is high enough (e. g. 100 cycles per second) the two spots will appear to exist simultaneously on the oscillograph screen.

As already mentioned, however, it is very desirable to join each spot to the centre of the screen by a straight line trace. This may be done by providing condensers 51 and 52 respectively connecting the anodes of the diodes 36 and 37 to ground, and similar condensers (not shown) for each of the other plates of the oscillograph. The relatively slow charging of the condensers 51 and 52 through the resistances 34 and 35 will cause the spots to describe radial straight lines, in the manner explained in the specification of co-pending application No. 667,259, filed May 4, 1946, the condensers 51 and 52 being discharged when the corresponding diodes 48 and 49 conduct.

In a slightly modified form of Fig. 2, the diodes may all be reversed and the resistance 50 may be connected to the positive high tension terminal 43 instead of to ground. In this case it is the negative changes of the anode potentials of the valves 38 and 39 which perform the switching, instead of the positive changes. The arrangement has an advantage when the indication of the oscillograph 4 has to be transmitted over a line for repetition on a distant oscillograph by the use of cathode follower amplifying circuits in the manner described in the specification of copending application No. 667,259. The advantage is associated with the fact that the sudden potential changes caused by the short-circuiting of the condensers 51 and 52 by the diodes 48 and 49 are positive changes, which are preferable for the most efficient operation of the cathode follower amplifiers.

It will be clear that, if desired, any other suitable type of one-way blocking devices capable of being unblocked by applied potentials may be used instead of the diodes 36, 37, 48, and 49, such for example as dry plate rectifiers, or triodes or like devices with grid electrodes which may be controlled by the pulses from the multivibrator.

Figs. 3 and 4 show one preferred form of the mechanical arrangements for determining the bearing from the traces on the oscillograph screen. It is assumed that the condensers 51 and 52 have been included in order to obtain the preferred radial traces, as explained.

The potentiometer 11 (Fig. 1) is enclosed in a horizontal box 53, and is provided with a vertical spindle 54 mechanically connected to the insulating member 27 which carries the contactors 12 and 13. To the spindle 54 is keyed a horizontal bevel gear wheel 55 which meshes with an equal vertical bevel gear 56 formed on the back of a rotatable ring member 57 which co-axially surrounds the screen 58 of the cathode ray tube 4. The front of the ring member 57 carries a bezel which holds a flat circular glass plate 59 just clear of the screen 58. To operate the device, the plate 59, or the ring member 57, is rotated by hand, causing a corresponding rotation of contactors 12 and 13. Two narrow annular scale plates 60 and 61 are co-axially arranged to surround the screen 58, one inside the other, just behind the glass plate 59. Neither of these plates is mechanically connected with the ring member 57, and the inner plate 60 is fixed. Plate 60 carries two scales, 0–180° on the starboard side and 0–180° on the port side, the corresponding points 0° and 180° on the two scales coinciding and being marked F (for "Fore") and A (for "Aft"), while the graduations "port 90°" and "starboard 90°" are designated "P" and "S" respectively. The outer plate rotates under the control of the ship's compass by known mechanism not shown, and its scale is marked 0–360°, with compass points if desired. The fixed scale plate is used for determining bearings relative to ship's head and the movable plate enables the bearings to be determined with respect to true north when desired. An index mark 62 at 0° on scale plate 60 and designated "F" enables the true heading of the ship to be determined from the movable plate 61. All engravings on scale plates 60 and 61 are on the outer surface.

The glass plate 59 carries a radial index line 63 on the back surface. This line should be of sufficient length to overlap both scale plates, but preferably should not extend into the central area of the glass plate through which the screen 58 is visible. It will be evident that the index line 63 effectively indicates the angle $\theta$ of the potentiometer 11 on the scale plate 60 subject to an appropriate zero adjustment which will be described later.

The glass plate 59 is also provided with a small central circle 64 engraved on the back surface by means of which the oscillograph traces may be approximately centered with respect to the scale plates 60 and 61.

Assuming that the apparatus is operating normally (the switch 28 (Fig. 1) being closed), and that an aircraft within range is transmittting bearing indicating waves, two radial straight line traces 65 and 66 will be seen on the screen. The trace 66 (which does not necessarily register with the index line 63) is the electronic cursor and is produced by the calibrator 10 in the manner explained. The trace 65 corresponds to the aircraft. In order accurately to measure the bearing of the aircraft, the ring 57 (or plate 59) is rotated by hand, rotating the contactors 12 and 13 (Fig. 1) at the same time, so that the electronic cursor 66 rotates about the centre of the screen until it coincides exactly with the trace 65, or with its mean position if it fluctuates. The bearing with respect to the ship's head is then obtained accurately by reading the position of the index line 63 on the scale 60, or with respect to true north, on the scale 61.

Certain preliminary adjustments, which will now be described, are necessary. It will be assumed that the mechanical coupling between the insulating member 27 (Fig. 1) through the spindle 54 and bevel gears has been set so that the index line reads zero on the scale plate 60 when the angle $\theta$ of the potentiometer 11 is zero. This may be done as accurately as desired.

In order to obtain approximate readings without the help of the electronic cursor, it will be convenient to centre the oscillograph 4 with respect to the ring member 57, and to set the oscillograph so that the effective deflection axes of the two pairs of plates correspond substantially with the F-A and P-S graduations on scale plate 60. These adjustments do not affect the accuracy when measuring bearings with the aid of the electronic cursor. It is also convenient, though not essential, to compensate approximately for the quadrantal error of the oscillograph 4 (due to any inequality between X— and Y— plate sensitivities) by setting the index line 63 to read port 45° (say) on scale plate 60 and adjusting resistances 23 and 26 so that the electronic cursor trace 66 also reads port 45° on scale plate 60, as nearly as may be judged. The accuracy of this adjustment is not important and the reason for making it is to ensure that when quadrantal errors arising in the direction finding equipment and/or from the site have been compensated by adjusting the direction finding equipment to bring the bearing trace 65 into registration with the electronic cursor 66, approximate bearings can be read off rapidly using trace 65 and scale plate 60 only, the electronic cursor being ignored or switched off by means of switch 28. The adjustment of the resistances 23 and 26 will not have to be repeated until the oscillograph 4 is replaced.

The adjustment for quadrantal instrumental error (and quadrantal site error, if any) should be made as follows, with the usual means provided in the direction finding system, making use of a test oscillator or other transmitter having a known bearing (port 45°, say) with respect to the ship's head. The plate 59 is adjusted as before so that the index line 63 reads port 45° on the scale plate 60. Then the quadrantal adjustment should be made until the trace 65 exactly coincides with the cursor trace 66. When this has been done, the bearing of any aircraft may be accurately determined by adjusting the cursor trace to coincide with the trace corresponding to the aircraft, the bearing with respect to the ship's head being obtained by reading the index line 63 on the scale 60, or with respect to true north, on the scale 61.

It will be seen that all errors due to the oscillograph cancel out, and there is no parallax to effect the accuracy of the readings. When coincidence of the two traces is obtained, the ratio of the two voltages at the outlets 20 and 19 of the calibrator 10 (Fig. 1) must be equal to the ratio of those at the outlets 3 and 2 of the direction finding system 1, so that the angle $\theta$ of the potentiometer must be equal to the bearing angle $\phi$ of the transmitter, provided the direction finding system 1 itself is free from error.

As stated above, it is convenient to be able to make rapid approximate bearing observations without using the electronic cursor; the reason for the initial centering and alignment of oscillograph 4 and the adjustment of resistances 23 and 26 will now be clear—they ensure that the angular position of the cursor trace 66 registers approximately with index line 63 at all settings of the calibrator. Provided that instrumental and set errors have been compensated the angular position of the trace 65 will be an approximate measure of the bearing, which can therefore be read approximately from scale plate 60.

In cases where the direction finding system is subject to quadrantal site error and is not provided with the means for correcting it, the procedure described above can be modified so that a correction is applied automatically when the electronic cursor is used. The error will not in this case be corrected when approximate bearings are measured directly by reading the angular position of trace 65 against scale plate 60.

The method can best be understood by recalling that with the preferred system already described, oscillographic quadrantal error was first eliminated approximately so far as it affected the cursor trace 66, by adjustment of resistances 23 and 26. The means provided for quadrantal compensation in the direction finding equipment 1 were then adjusted to cause the trace 65 to coincide with trace 66 when the relative bearing of a transmitter was port 45° (say), with the calibrator 53 set to make the angle $\theta$ (Fig. 1) equal to port 45°. If now the direction finding equipment is not provided with means for quadrantal compensation it is possible to achieve the same result by introducing a quadrantal error into the electronic cursor indication equal to the sum of the quadrantal errors of the direction finding equipment and of the site. It will be appreciated that readings taken without the aid of the electronic cursor will then be subject to quadrantal error equal to the algebraic sum of the quadrantal components introduced by the site, the direction finding equipment and the oscillograph.

The alternative procedure is as follows. After centering and aligning the deflection axes of oscillograph 4 as before, the calibrator is set to port 45° (say) and resistances 23 and 26 are adjusted to bring the cursor trace 66 into coincidence with bearing trace 65 when a signal on a bearing of port 45° is being received. The new adjustments of resistances 23 and 26 will naturally differ from those obtained in the preferred method of adjustment. To show how this difference results in a quadrantal compensation, consider the simple case in which resistances 21, 22, 24 and 25 of Fig. 1 are all equal, and resistances 23 and 26 are also equal. Under these conditions $\tan \theta = E_2/E_1$. Suppose that the resistance 26 is adjusted to be K times the resistance 23, where K differs from 1 by a small fraction. Let the angle $\theta$ be effectively increased to $\theta + d\theta$ thereby. Then it can be shown by simple trigonometry that $d\theta = \frac{1}{2}(K-1)\sin 2\theta$ approximately. Thus $d\theta$ is an error of quadrantal form and can be made to compensate any quadrantal error in the site or D/F system by suitable choice of K— that is, by adjustment of the resistance 26.

Another but less convenient method is to deform the square ABCD (Fig. 1) into a rhombus of which the angle CAD is $2a$. Then it can be shown that $d\theta = \frac{1}{2}(\cot a - 1) \sin 2\theta$, approximately. In this case, of course, the resistances 23 and 26 will be adjusted to be equal.

A similar expedient may be adopted to correct the octantal error which may arise in the antenna system of the direction finding system. The resistance elements of the square are bent into the form of the re-entrant equilateral octagon shown in Fig. 5. It can be shown that in this case $d\theta = \frac{1}{2} b \sin 4\theta/(1 + \sin 2\theta + \cos 2\theta)$, approximately, where $b$ is the acute angle between a side of the octagon and a side of the original square. The denominator only varies about 10% as $\theta$ varies from 0 to 45°, so that $d\theta$ is octantal and nearly sinusoidal in form. Since the octantal error arising in an antenna system depends on the frequency, the compensation can only be partial in any case, so that this approximation is likely to be good enough. The values of $d\theta$ obtainable are quite convenient; thus, for example, if $b = 12°$ the maximum value of $d\theta$ is about 2.5°. It will be understood that the calibrator 10 of Fig. 1 could be arranged in various other ways. While the type of potentiometer 11 which has been described is preferred, some other known device may be used to produce deflecting voltages (or currents) which characterise an angle or other comparison quantity whose value is known and can be indicated independently of the oscillograph on a scale which is associated with the device. The oscillograph could be provided with deflecting coils for electromagnetic deflection, instead of the plates shown. The potentiometer 11 could take any of the forms described in application No. 720,529 mentioned above, which may be suitable for the purpose.

While it is probably best to arrange so that the traces 65 and 66 shown in Fig. 3 can be brought into coincidence, they could alternatively be arranged at different distances from the centre so that they may be brought into registration without actually overlapping. Other methods of adjusting the cursor trace could be used.

It may be pointed out that the following advantages accrue to the arrangement according to the invention:

1. Smaller oscillographs can be used because a larger percentage of the screen area is usable, since the inaccuracies due to curvature of the screen (and other causes) do not affect the measurements.

2. Cheaper oscillographs can be used for the above reasons, and no calibration of the oscillograph is necessary.

3. No recalibrations or readjustments are necessary when an oscillograph is changed (except when it is desired to take rough measurements without the cursor as explained above).

4. Certain types of errors to which a direction finding system is liable can be automatically compensated by the calibrator.

What is claimed is:

1. A display arrangement for a cathode ray oscillograph comprising means for producing a first pair of voltages whose ratio is determined by an unknown angular magnitude, a potentiometer adapted to produce a second pair of voltages whose ratio is determined by the angular position of the contacting member of the said potentiometer, periodically operating means for alternately applying the said first and second pairs of voltages to the deflecting plates of the oscillograph in such manner as alternately to produce corresponding radial straight line traces on the oscillograph screen, and means for adjusting the said contacting member in such manner as to bring the two traces into coincidence whereby the corresponding angular position gives the value of the unknown angular magnitude.

2. An arrangement according to claim 1 in which the potentiometer comprises four straight, equal, uniform, resistance elements arranged in a square, and a pair of straight contacting members arranged in a straight line passing through and rotatable about an axis through the centre of the said square.

3. An arrangement according to claim 2 comprising a direct current source connected to the said contacting members, and means for deriving the said second pair of voltages respectively from the corresponding pairs of diagonal corners of the bridge.

4. An arrangement according to claim 3 comprising means for independently adjusting the magnitudes of the said second pair of voltages.

5. An arrangement according to claim 4 in which the said periodically operating means comprises a periodically operating electronic change-over switch.

6. An arrangement according to claim 5 in which the switch comprises circuits including rectifiers through which the said pairs of voltages are respectively applied, and means for periodically blocking and unblocking the said rectifiers in such manner as alternately to apply the said first and second pairs of voltages to the said deflecting plates.

7. A display arrangement for a cathode ray oscillograph comprising means for producing a first pair of voltages whose ratio is determined by an unknown angular magnitude, a potentiometer adapted to produce a second pair of voltages whose ratio is determined by the angular position of the contacting member of the said potentiometer, periodically operating means for alternately applying the said first and second pairs of voltages to the deflecting plates of the oscillograph in such manner as alternately to produce corresponding radial straight line traces on the oscillograph screen, and means for adjusting the said contacting member in such manner as to bring the two traces into coincidence whereby the corresponding angular position gives the value of the unknown angular magnitude, an angular scale plate graduated in degrees of angle and arranged coaxially to surround the oscillograph screen, an index co-operating with the said scale plate, and means mechanically coupled to the said contacting member or members for producing relative movement between the said index and the said scale plate for the purpose of indicating the said angular position, on the said scale plate.

8. An arrangement according to claim 7 in which the said scale plate is fixed and in which the said index comprises a radial line carried on a glass plate rotatable in front of the oscillograph screen and co-axially with respect to the scale plate, the said glass plate being mechanically coupled to the said contacting member or members.

9. A radio direction finding system comprising a display arrangement according to claim 8, means for receiving waves transmitted from a station, and means for deriving from the said waves the said first pair of voltages whose magnitude is determined by the direction to the said station.

10. A radio direction finding system for a vessel comprising a display arrangement according to claim 9, a second movable annular scale plate arranged co-axially with respect to the fixed scale plate and graduated in degrees of angle and adapted to co-operate with the said index, a compass adapted to rotate the movable scale plate in accordance with the orientation of the vessel, means for receiving waves transmitted from an aircraft or other station, and means for deriving from the said waves the said first pair of voltages whose magnitude is determined by the direction to the said aircraft or station.

11. A system according to claim 10 in which the ratio of the first pair of voltages is subject to a systematic error of periodic form and in which the said potentiometer is modified in such manner as to introduce an error of like periodic form into the said second pair of voltages of such magnitude as substantially to correct the said systematic error when the said traces have been brought into coincidence.

12. A system according to claim 11 subject to a quadrantal site error in which the said modified potentiometer comprises four straight, equal, uniform resistances arranged to form a rhombus having its angles so chosen as substantially to compensate the said quadrantal error.

RICHARD FRANCIS CLEAVER.

REFERENCES CITED

The following references are of record in the file of this patent:

UNITED STATES PATENTS

| Number | Name | Date |
| --- | --- | --- |
| 1,518,543 | Nyquist | Dec. 9, 1924 |
| 1,684,403 | Mason | Sept. 18, 1928 |
| 1,953,157 | Dietze et al. | Apr. 3, 1934 |
| 2,178,074 | Jakel et al. | Oct. 31, 1939 |
| 2,186,006 | Buckingham | Jan. 9, 1940 |
| 2,252,058 | Bond | Aug. 12, 1941 |
| 2,267,430 | Slezskinsky | Dec. 23, 1941 |
| 2,397,128 | Cole et al. | Mar. 26, 1946 |
| 2,410,703 | Berkoff et al. | Nov. 5, 1946 |
| 2,428,021 | Grieg | Sept. 30, 1947 |